United States Patent
Oka et al.

(10) Patent No.: US 10,477,061 B2
(45) Date of Patent: Nov. 12, 2019

(54) IMAGE FORMING APPARATUS WITH TWO-SIDED COPYING AND VARIABLE IMAGE DATA TRANSFER CLOCK FREQUENCY

(71) Applicant: CANON KABUSHIKI KAISHA, Tokyo (JP)

(72) Inventors: Yushi Oka, Abiko (JP); Masato Furukawa, Nagareyama (JP); Kaoru Hamada, Nagareyama (JP); Seiji Shibaki, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/897,434

(22) Filed: Feb. 15, 2018

(65) Prior Publication Data

US 2018/0255197 A1 Sep. 6, 2018

(30) Foreign Application Priority Data

Mar. 3, 2017 (JP) ................................ 2017-040916

(51) Int. Cl.
| H04N 1/00 | (2006.01) |
| H04N 1/203 | (2006.01) |
| H04N 1/21 | (2006.01) |

(52) U.S. Cl.
CPC ......... *H04N 1/2034* (2013.01); *H04N 1/0083* (2013.01); *H04N 1/2104* (2013.01)

(58) Field of Classification Search
CPC ........................... H04N 1/2034; H04N 1/0083
USPC ................................................ 358/1.15, 1.16
See application file for complete search history.

(56) References Cited

U.S. PATENT DOCUMENTS

| 5,751,438 A * | 5/1998 | Murai .................... H04N 1/203 358/400 |
| 8,477,387 B2 | 7/2013 | Shiraishi |
| 2003/0081253 A1* | 5/2003 | Sekiguchi .......... H04N 1/00347 358/1.16 |
| 2008/0180765 A1* | 7/2008 | Nakashita .......... H04N 1/00933 358/498 |

FOREIGN PATENT DOCUMENTS

| JP | 2000280580 A | 10/2000 |
| JP | 2011160362 A | 8/2011 |

OTHER PUBLICATIONS

Copending, unpublished U.S. Appl. No. 15/822,750, to Fumika Nakajima, filed Nov. 27, 2017.

* cited by examiner

*Primary Examiner* — Jamares Q Washington
(74) *Attorney, Agent, or Firm* — Venable LLP

(57) ABSTRACT

An image forming apparatus temporarily stores, in an image memory, image data generated by a front surface reading unit and a back surface reading unit for reading images of a front surface and a back surface of an original respectively. A CPU of an image forming apparatus, at a time of starting a copy job, sets an output frequency of the image memory (transfer rate of image data) to a first frequency F1 that is lower than a second frequency F2. The CPU sets the output frequency of the image memory to the second frequency F2 when transfer of the image data of the first page which corresponds to the front surface of a first original completes.

10 Claims, 7 Drawing Sheets

IMAGE FORMING APPARATUS WITH TWO-SIDED COPYING AND VARIABLE IMAGE DATA TRANSFER CLOCK FREQUENCY

BACKGROUND OF THE INVENTION

Field of the Invention

The present invention relates to an image forming apparatus that has a function for copying an image of an original by using sensors that can respectively read front surface and back surface images of the original, which is conveyed along a conveyance path.

Description of the Related Art

Image reading apparatuses that can respectively read images on both the front surface and the back surface of an original that is conveyed through a conveyance path have been proposed. In an image reading apparatus of Japanese Patent Laid-Open No. 2011-160362, rather than reading images of the front surface and the back surface of an original in order by causing the original to be reversed, simultaneous reading of the images on both sides while the original is being conveyed is made possible. Image data obtained by reading is stored temporarily in an image memory from respective reading sensors for the front surface and for the back surface of the original, and is transferred on the same path at a predetermined timing to an image processing apparatus that performs image processing. In such a case, by making the transfer rate for image data from an image memory higher than a transfer rate of image data from each reading sensor to image memory, it is possible to avoid a deterioration in reading throughput associated with transfer of image data on the same path.

Also, in an image forming apparatus having a copy function, there is a demand for shortening the time taken until output of a copy image corresponding to a first original image completes (FCOT: First Copy Output Time). In an image forming apparatus of Japanese Patent Laid-Open No. 2000-280580, the FCOT is shortened by starting image formation while obtaining image data in accordance with the size of the image data and the image formation speed. By shortening the FCOT, it is possible to reduce user wait time and power consumption of the image forming apparatus.

As above described, in a configuration that temporarily stores in an image memory image data generated by reading sensors for a front surface and for a back surface of an original, it is necessary to accelerate the transfer rate of the image data from an image memory in order to increase reading throughput. However, there is a possibility that the FCOT will become longer when the transfer rate for image data from image memory is higher than the transfer rate for image data from a reading sensor to the image memory.

Specifically, in order to avoid input of image data into an image memory not keeping up with output of image data from the image memory, it is necessary to delay the image data output start timing in relation to the image data input start timing. This will lead to a delay in the start timing for image formation based on the image data that is transferred from the image memory. As a result, it ceases to be possible to shorten the FCOT.

SUMMARY OF THE INVENTION

The present invention was conceived in view of the above described issues. The present invention provides a technique for realizing, in an image forming apparatus comprising a plurality of reading sensors that can read both sides of an original, control of transfer of image data for shortening the FCOT without causing the throughput of reading to deteriorate.

According to one aspect of the present invention, there is provided an image forming apparatus, comprising: a first reading unit and a second reading unit configured to respectively read images of a first surface and a second surface of an original conveyed through a conveyance path, and to generate image data; a first storage unit configured to temporarily store the image data generated by the first reading unit and the second reading unit; a setting unit configured to set a transfer rate for when image data is transferred from the first storage unit; a transfer unit configured to transfer the image data stored in the first storage unit at the transfer rate set by the setting unit, for image formation based on the image data; a second storage unit configured to store the image data transferred by the transfer unit; and an image forming unit configured to form an image based on the image data stored in the second storage unit, wherein the setting unit, at a time of starting a job for copying an image of an original, sets the transfer rate to a first transfer rate which is lower than a second transfer rate, and sets the transfer rate to the second transfer rate when transfer of image data of a first page corresponding to the first surface of a first original completes.

By virtue of the present invention, it is possible to realize, in an image forming apparatus comprising a plurality of reading sensors that can read both sides of an original, control of transfer of image data for shortening the FCOT without causing the throughput of reading to deteriorate.

Further features of the present invention will become apparent from the following description of exemplary embodiments (with reference to the attached drawings).

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

<Configuration of Image Forming Apparatus>

Figure 1:
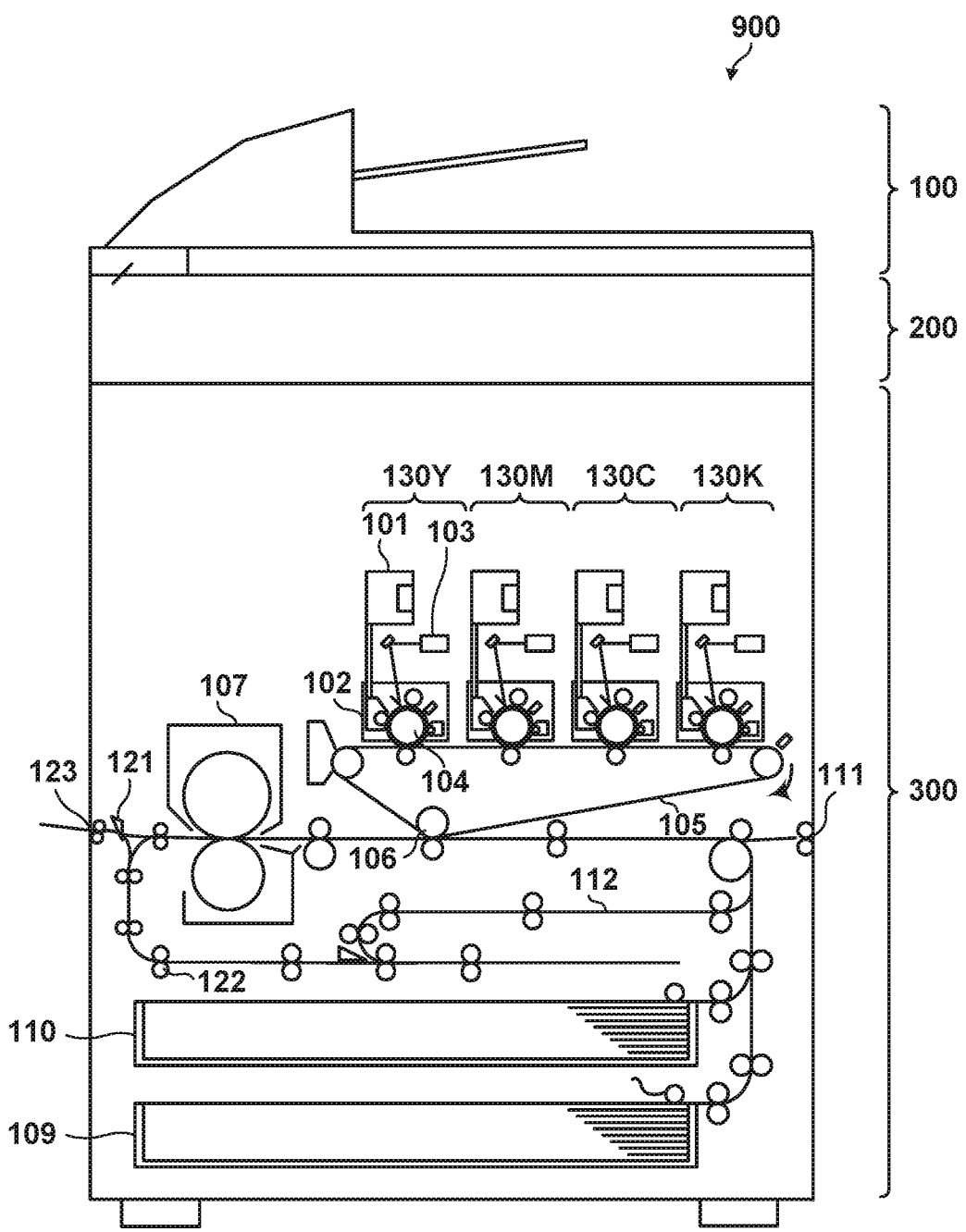
FIG. 1 is a sectional view which illustrates an example configuration of an image forming apparatus 900.
Figure 2:
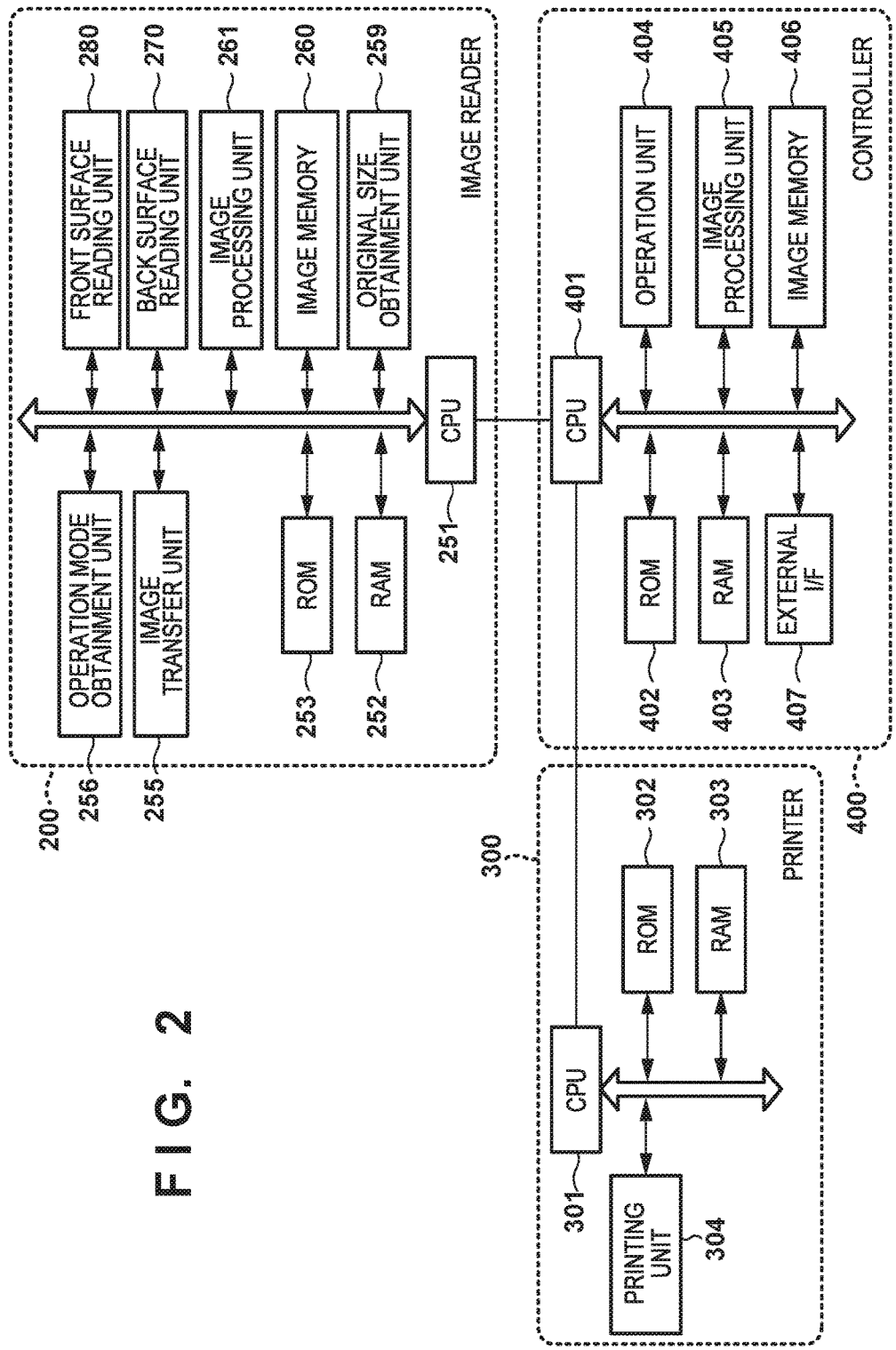
FIG. 2 is a block diagram which illustrates an example configuration of a control system of the image forming apparatus 900.

FIG. 1 is a sectional view which illustrates an example configuration of an image forming apparatus 900 which is an image processing apparatus according to an embodiment. FIG. 2 is a block diagram illustrating an example configuration of a control system of the image forming apparatus 900. As illustrated in FIG. 1, the image forming apparatus 900 is configured by an image reader 200 which is an image reading unit, an automatic document feeder (ADF) 100, and a printer 300 which is an image forming unit. As illustrated in FIG. 2, the image forming apparatus 900 is further equipped with a controller 400 which controls the entire apparatus. In the present embodiment, the controller 400 is connected between the image reader 200 and the printer 300. Note that the controller 400 is arranged physically within the image reader 200 or the printer 300. Hereinafter, description regarding a control system of the image forming apparatus 900 is first given.

(Image Reader 200)

The image reader 200 is equipped with a CPU 251, a RAM 252, a ROM 253, an image transfer unit 255, an operation mode obtainment unit 256, an original size obtainment unit 259, an image memory 260, an image processing unit 261, a back surface reading unit 270, and a front surface reading unit 280. The CPU 251 comprehensively controls each unit of the ADF 100 and the image reader 200. The ROM 253 is a storage device which stores, as programs, details of control to be executed by the CPU 251. The RAM 252 is a storage device used as a work area of the CPU 251.

The front surface reading unit 280 and the back surface reading unit 270 are sensors that read an image of an original one line at a time by scanning the image. The front surface reading unit 280 and the back surface reading unit 270 generate image data by respectively reading the images of the front surface (first surface) and the back surface (second surface) of an original conveyed along a conveyance path within the ADF 100. While the image of the front surface of the original conveyed along the conveyance path is being read by the front surface reading unit 280, the back surface reading unit 270 can read the image of the back surface of the original. Specifically, the front surface reading unit 280 and the back surface reading unit 270 can simultaneously read the images of the front surface and back surface of the original, respectively.

Image data generated by the front surface reading unit 280 and the back surface reading unit 270 reading the image for each line is temporarily stored in the image memory 260. Image data of a number of lines in the sub-scanning direction (conveyance direction) of the original corresponding to a plurality of pages can be stored in the image memory 260. The image transfer unit 255 transfers the image data within the image memory 260 to an image memory 406 of the controller 400 which is described later.

The operation mode obtainment unit 256 can obtain information of an operation mode (for example, a single-sided mode or a double-sided mode) of the image forming apparatus 900. The original size obtainment unit 259 is connected to size detection sensors 32 and 33 on an original tray 30 and can obtain the size of the originals on the original tray 30 by using the sensors. In a case where contamination is present on the front surface reading unit 280 or the back surface reading unit 270 at a time of a reading of an original image by the image reader 200, the image processing unit 261 performs contamination correction and the like in order to reduce the effect of the contamination, on the image data obtained by the reading.

(Printer 300)

The printer 300 is equipped with a CPU 301 and a printing unit 304. The CPU 301 comprehensively controls the printing unit 304 and each unit within the printer 300. A ROM 302 is a storage device which stores, as programs, details of control to be execute by the CPU 301. A RAM 303 is a storage device used as a work area of the CPU 301. The printing unit 304 corresponds to a device relating to image formation (printing) within the printer 300 such as image forming stations 130Y, 130M, 130C, and 130K, an intermediate transfer belt 105, a secondary transfer unit 106, a fixing unit 107, and various rollers described later.

(Controller 400)

The controller 400 is equipped with a CPU 401, a ROM 402, a RAM 403, an operation unit 404, an image processing unit 405, the image memory 406, and an external I/F 407. The CPU 401 comprehensively controls each unit within the controller 400. The ROM 402 is a storage device which stores, as programs, details of control to be executed by the CPU 401. The RAM 403 is a storage device used as a work area of the CPU 401. The CPU 401 can communicate with the CPU 251 of the image reader 200 and the CPU 301 of the printer 300.

The image processing unit 405 performs various image processes such as an image data rotation process and a process for modifying the size of an image to be printed by the printer 300. Image data transferred from the image reader 200 and image data received via the external I/F 407 is stored in the image memory 406. The image data stored in the image memory 406 is transferred to the printer 300 and is used in image formation. Specifically, the printer 300 (the printing unit 304) forms an image based on the image data stored in the image memory 406. The external I/F 407 is a communication I/F connected to a network that supports a communication protocol such as TCP/IP. The external I/F 407 can receive a print job from an external apparatus (such as a computer) capable of communication via the network, or can transmit information of the image forming apparatus 900 to an external apparatus.

<Configuration and Operation of the Image Reader 200>

Figure 3:
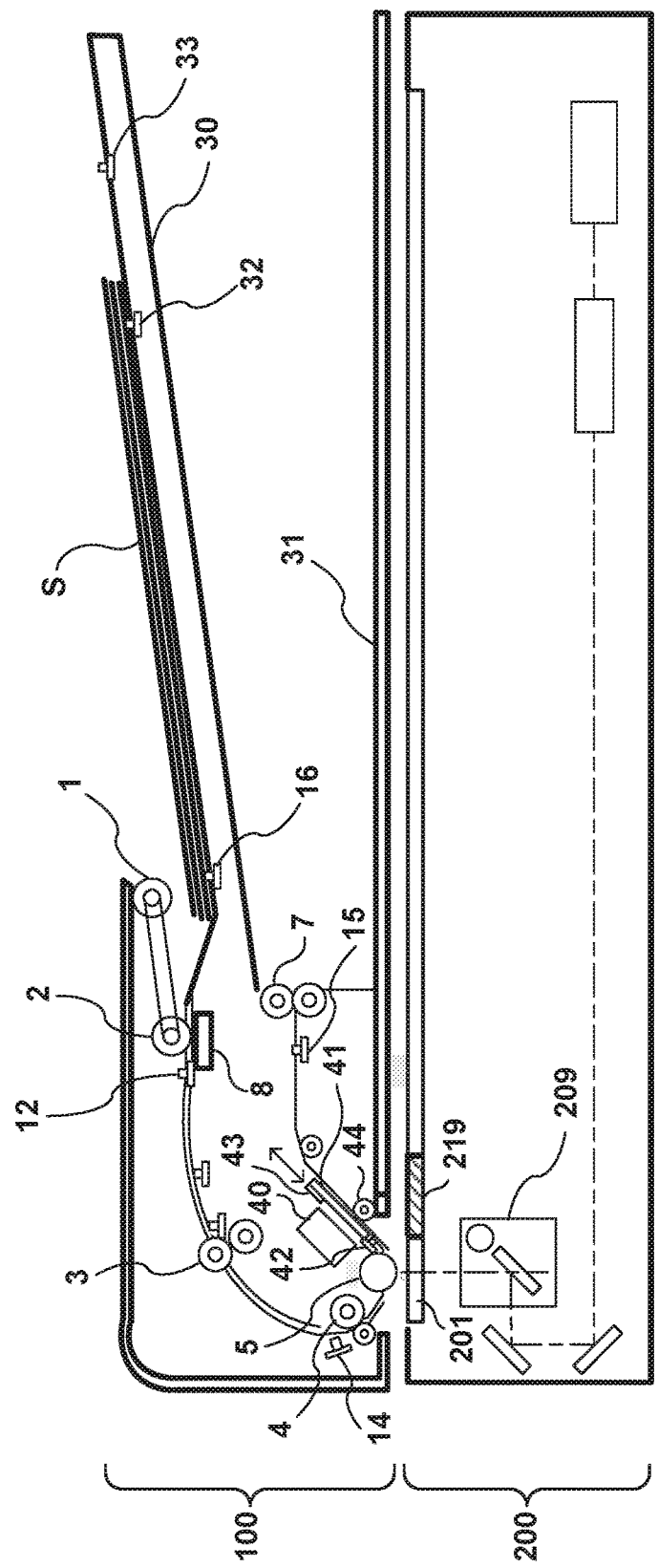
FIG. 3 is a sectional view which illustrates an example configuration of an image reader 200.

Next, with reference to FIG. 3, description of a single-sided read operation and a double-sided read operation for an original image by the image reader 200 is given in order. These operations by the image reader 200 are controlled by the CPU 251 of the image reader 200. The image reader 200 reads an image of one side or both sides of an original sheet while feeding and conveying the original sheet by using the ADF 100.

(Single-Sided Reading Operation)

When a read job which uses the ADF 100 is started by the CPU 251, a scanner unit 209 moves to a position directly below a reference white plate 219, and a shading process is performed. Note that the front surface reading unit 280 (FIG. 2) is included in the scanner unit 209. After the execution of the shading process, the scanner unit 209 moves to a position directly below a platen glass 201 and waits until the original reaches the reading position.

In the ADF 100, a paper feed roller 1 drops to an original surface of an original bundle S and starts rotating, and the paper feed roller 1 reaches the paper surface of the uppermost original. By this, the uppermost original (original sheet) of the original bundle is fed. From the original tray 30 on which the original bundle S configured by one or more originals is stacked, the uppermost original of the original bundle S is fed and conveyed one sheet at a time. At that time, feeding and conveyance by a separation roller 2, a separation pad 8, and the paper feed roller 1 are performed in order to prevent the originals from being fed overlappingly. In this way, the originals fed and conveyed by the paper feed roller 1 are separated one sheet at a time by the action of the separation roller 2 and the separation pad 8.

An original separated by the separation roller 2 and the separation pad 8 is conveyed to a registration roller 3, and the conveyance is temporarily stopped in a state where the original abuts the registration roller 3. Note, when temporarily stopped, by conveying the originals slightly in the state where it abuts the registration roller 3, a part of a leading edge of the original becomes raised on the upper side and a space (loop) is formed. By this, a skew in the conveyance of the original is corrected. At the downstream side of the registration roller 3, a pre-reading roller 4 is positioned, and this roller conveys the original in the direction of the vicinity of the platen glass 201 for original flow-reading.

When preparation for receiving image data generated by reading an original by the image reader 200 completes in the controller 400, an image read request is notified from the controller 400 to the image reader 200. When the image reader 200 receives the image read request, conveyance of an original forming a loop at the position of the registration roller 3 and in a temporarily stopped state restarts towards the downstream side of the registration roller 3.

The original conveyed downstream of the registration roller 3 is sent to the pre-reading roller 4. The original further passes through the pre-reading roller 4 and is sent to an original reading position on top of the platen glass 201 in the vicinity of a platen roller 5. When the original is conveyed to the original reading position of the platen glass 201, the leading edge of the original is detected by a reading sensor 14. Movement of the original of a distance from the position of the reading sensor 14 to the original reading position on the platen glass 201 is measured by counting a clock of a conveyance motor (not shown) being used as a driving source of the pre-reading roller 4 and the platen roller 5. By this, a timing at which the original passes through the original reading position on the platen glass 201 is measured with good accuracy. The measured timing for passing through the original reading position is determined as a leading edge reference position of the image on the front surface of the original. Reading of the image on the front surface is performed by the scanner unit 209 using a determined leading edge reference position as a reference position.

When a trailing edge of the original is detected by a post-separation sensor 12, existence or absence of a next original on the original tray 30 is detected by a sensor 16. Detection information according to the sensor 16 is notified to the controller 400. While the original is being conveyed, the trailing edge of the original passes through positions of the separation roller 2, the registration roller 3, the pre-reading roller 4, and the platen roller 5 in order, and the trailing edge of the original is detected by a discharge sensor 15. After a predetermined amount of time from the detection timing of the trailing edge of the original by the discharge sensor 15, the entirety original is discharged to an original discharge tray 31 by a discharge roller 7. By this, the conveyance and read sequence of one original ends.

Other than cases where the number of originals to be read is designated by a read job, fundamentally the above described processing is repeated for each original until there are no originals on the original tray 30. In a case where it is detected by the sensor 16 that there is no original on the original tray 30 when the trailing edge of an original is detected by the post-separation sensor 12, the CPU 251 determines the original being conveyed to be the final original. The CPU 251 stops a conveyance motor that is the driving source of each roller, returns the paper feed roller 1 to an original position, and ends the read job when the final original is discharged to the original discharge tray 31.

(Double-Sided Read Operation)

In double-sided reading of an original image performed using the ADF 100, reading of the image on the front surface of the original is executed using the scanner unit 209, and reading of the image of the back surface is executed using a scanner unit 40. Note that the back surface reading unit 270 (FIG. 2) is included in the scanner unit 40.

First, feeding and conveyance of each original sheet in the original bundle S stacked on the original tray 30 and reading of the image on the front surface of the original are performed similarly to the single-sided read operation described above. The leading edge of the original is detected by a reading sensor 42 after the leading edge of the original passes the original reading position of the scanner unit 209 in order to read the image on the back surface. Movement of the original of a distance from the position of the reading sensor 42 to the original reading position on a platen glass 41 is measured by counting a clock of the conveyance motor (not shown). By this, a timing at which the original passes through the original reading position on the platen glass 41 is measured with good accuracy. The measured timing for passing through the original reading position is determined as a leading edge reference position of the image on the back surface of the original. Reading of the image on the back surface is performed by the scanner unit 40 using the determined leading edge reference position as a reference.

Note that the platen glass 41 is able to move in directions of the arrows indicated in FIG. 3. A reference white plate 43 on the platen glass 41 is used for a shading process in a state in which it is moved to a position at which the original is read by the scanner unit 40.

<Configuration and Operation of the Printer 300>

Next, with reference to FIG. 1, an image forming operation (a print operation) by the printer 300 will be described. The image forming operation is controlled by the CPU 301 of the printer 300. The printer 300 comprises the image forming stations 130Y, 130M, 130C, and 130K for forming toner images using toner (developer) of the colors yellow (Y), magenta (M), cyan (C), and black (K) respectively. In FIG. 1, reference numerals are applied to configuration parts of the Y color station only, but it is possible to employ the same configuration for all of the four stations. Note that each station is an example of an image forming unit that forms an image on an image carrier such as a photosensitive drum (photosensitive member) 104, and an intermediate transfer belt (intermediate transfer body) 105, by using toner.

The image data generated by reading the original image by the scanner unit 209 or the scanner unit 40 is sent to the printer 300 after image processing is performed by the controller 400. The image data sent to the printer 300 is inputted into an exposure control unit 103 corresponding to each color. By the exposure control unit 103 outputting a laser beam based on image data, and irradiating the laser beam onto a photosensitive drum 104, an electrostatic latent image corresponding to the image data is formed on the photosensitive drum 104. A developing unit 102 forms a toner image on the photosensitive drum 104 by developing the electrostatic latent image formed on the photosensitive drum 104 using toner of the corresponding color.

The toner image formed on the photosensitive drum 104 of each of the image forming stations 130Y, 130M, 130C, and 130K are transferred overlappingly onto the intermediate transfer belt 105. By this, a multicolor toner image made up of Y, M, C, and K is formed on the intermediate transfer belt 105. The toner image on the intermediate transfer belt 105 is transferred by the secondary transfer unit 106 to paper (a sheet) that was conveyed from one of cassettes 109 or 110 or a manual insert feeding unit 111. The toner image transferred to the sheet is fixed to the sheet by fixing process by the fixing unit 107.

In the printer 300, a toner image is formed on the top surface of sheet by the secondary transfer unit 106 in this way. In the case where the sheet is discharged to the outside as is, the sheet ends up being discharged from a discharge unit 123 in a state in which a toner image is formed on the top surface thereof. In the case of the image forming apparatus 900 copying a plurality of pages of originals, and forming images on sheets in the order in which the original images are read, it is desirable that the sheets be discharged in the same page order as the originals. In such a case, it is necessary to cause the top surface and the bottom surface of a sheet after the fixing process to be reversed prior to discharging from the discharge unit 123.

Accordingly, in the case of performing image formation to one side of a sheet, after the fixing process, the printer 300 first conveys the sheet in the direction of a conveyance roller 122 by using a flapper 121. After that, the printer 300 temporarily stops the conveyance roller 122, and then reverses the rotation thereof, thereby conveying the sheet in the reverse direction, and conveys the sheet in the direction of the discharge unit 123 by using the flapper 121. By this, the sheet is discharged from the discharge unit 123 in a state in which the toner image is formed on the bottom surface.

Meanwhile, in the case of performing image formation to both sides of a sheet, after completing image formation on one side, the printer 300 conveys the sheet in the direction of the conveyance roller 122 by using the flapper 121. Furthermore, the printer 300, via a double-sided conveying path 112, resends the sheet to the secondary transfer unit 106. Accordingly, image formation on the second surface is performed by a toner image being transferred by the secondary transfer unit 106 to the second surface of the sheet on the first surface of which the toner image (image) has been formed. After that, the sheet is discharged from the discharge unit 123 in order after toner image fixing processing is performed on the second surface of the sheet.

The term "printer output" in the follow description may indicate processing from when sheet feeding from the cassette 109, 110, or the like is started until image formation (fixing) completes. Alternatively, it may indicate processing from when image formation (exposure) is started in accordance with the start of output of image data from the controller 400, in a state in which pre-processing (conveyance of a sheet until the registration roller 3) is performed in advance, until the completion of image formation (fixing). In the present embodiment, description assumes the latter. Also, in the present embodiment, it is assumed that the output frequency when outputting image data from the image memory 260 to the controller 400 is higher than the frequency of image formation (exposure) of the printer.

<Image Memory>

Figure 4:
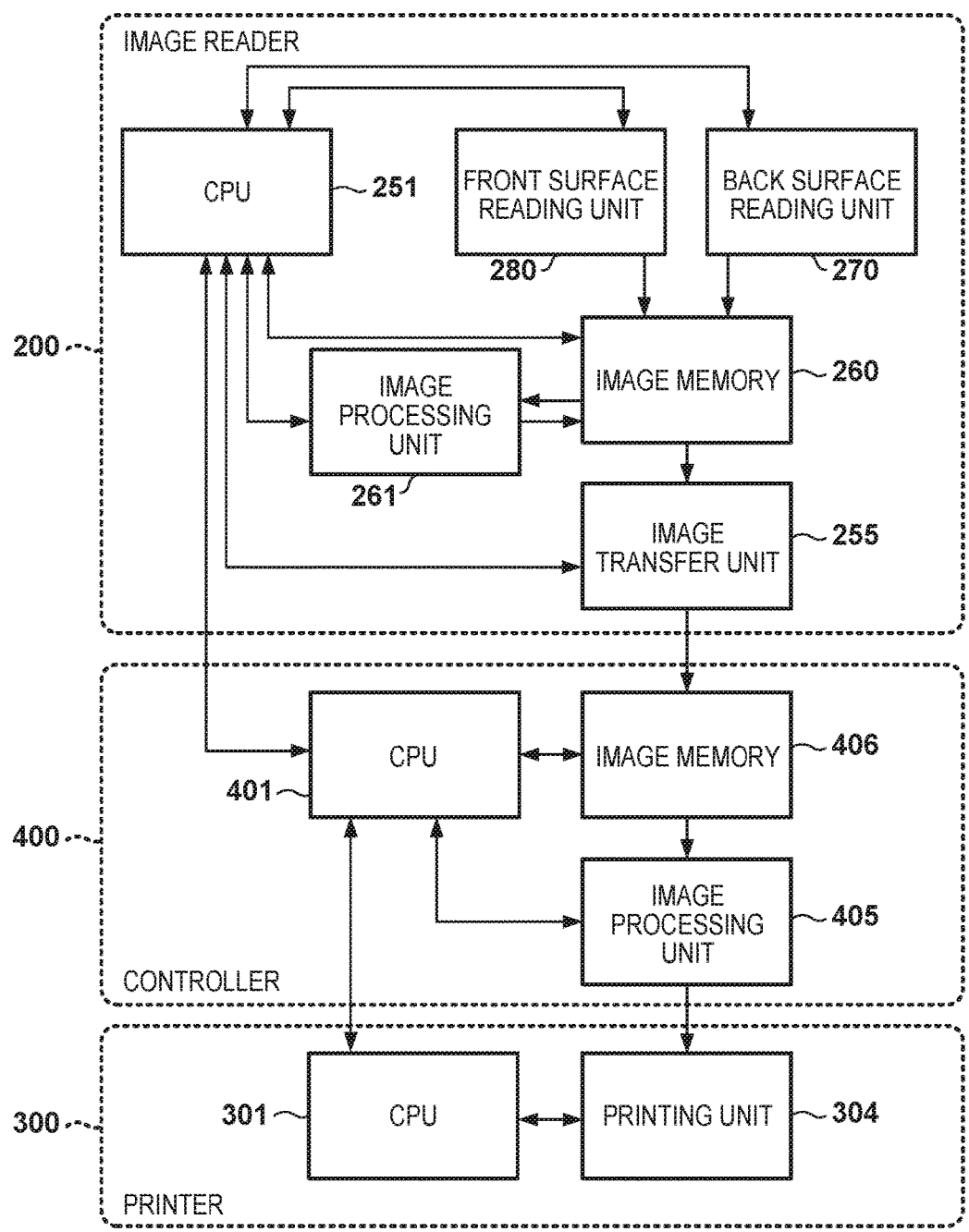
FIG. 4 is a block diagram which illustrates transfer paths of image data in the image forming apparatus 900.

FIG. 4 is a block diagram which illustrates transfer paths of image data according to the image forming apparatus 900 of the present embodiment. As described above, the image data generated by the front surface reading unit 280 and the back surface reading unit 270 in the image reader 200 is all first stored in the image memory 260. The image data stored in the image memory 260, after that, is transferred to the image memory 406 of the controller 400 by the image transfer unit 255 after image processing such as correction is performed by the image processing unit 261 as necessary.

The first reason for providing the image memory 260 in the image reader 200 is to enable output to the controller 400 at any timing (enable control of the timing of the output to the controller 400) by first storing the image data in the image memory 260. For example, in a double-sided mode in which the images on both sides of the original are read, a duration over which reading of images on the front surface and the back surface is performed concurrently (simultaneously) arises. This is because in the original conveyance path in the ADF 100, the scanner unit 209 which includes the front surface reading unit 280 and the scanner unit 40 which includes the back surface reading unit 270 are arranged at positions that are close to each other. In such a case, two paths for transferring image data are necessary for the image reader 200 to simultaneously transfer the image data of the front surface and image data of the back surface to the controller 400. Also, it is necessary to duplicate the circuit for processing the respective image data and the like. This leads to an increase in the size and cost of the apparatus.

For such reasons, in the present embodiment, the image data obtained by reading is first stored in the image memory 260, and the image data of the front surface and the back surface is transferred to the controller 400 in order of each surface at a timing when the controller 400 is able to receive it. By this, miniaturization and cost reduction of the apparatus are realized.

A second reason for providing the image memory 260 in the image reader 200 is to enable execution of image processing such as contamination correction on the image data by the image processing unit 261 prior to transfer to the controller 400. For example, by conveying a large number of originals, contamination such as paper dust of an original or the remains of glue of a sticky note that was affixed to an original easily attaches to the platen glass 201 and the platen roller 5. Due to such contamination, the quality of image obtained by reading the original image is degraded. By identifying the position of a contamination in a main scanning direction by performing contamination detection in an interval between sheets, it is possible to remove the contamination itself that is included in the read image by performing correction by the image processing unit 261 on the corresponding location of the read image.

Since the above described contamination correction is performed by using image data of a region other than the region in which the contamination is present, it is difficult to achieve the same quality as the image prior to the correction in the image after the correction. However, since a contaminant adhered to a side of the platen roller 5 is blocked by the original S when seen from the side of the scanner unit 209, correction would conventionally have been unnecessary. Accordingly, the image reader 200 first stores the image data of the read image in the image memory 260 in order to determine whether there is contamination requiring correction. Furthermore, the image reader 200, by comparing the result of contamination detection in the interval between sheets with the image data of a predetermined distance from the leading edge of the sheet of the original, can realize detection of contamination for which correction is necessary, and perform the necessary contamination correction on the image data.

By implementing such an image processing function in the image reader 200, even in a case where the controller 400 only has a simple image processing function, for example, it is possible to realize image processing for improving the quality of the read image.

Also, storing the image data in the image memory 260 is effective for handling a case where a delay occurs in image processing of the controller 400. For example, when a delay occurs in image processing of the controller 400 in a case of not storing image data in the image memory 260, it is necessary for the image reader 200 to stop the conveyance and reading of the original and wait until the controller 400 becomes able to receive image data. As a result, reading throughput deteriorates. However, by accumulating image data in the image memory 260 until the controller 400 completes preparation for receiving image data, it is possible to continue conveyance and reading of originals as long as the image memory 260 does not becomes full. When preparation by the controller 400 completes, it is possible to prevent or reduce the deterioration of throughput for the system as a whole by transferring the image data accumulated in the image memory 260 to the controller 400.

<Image Data Transfer Rate>

A clock generator for generating a clock is integrated in the front surface reading unit 280 and the back surface reading unit 270, and the front surface reading unit 280 and the back surface reading unit 270 transfer image data to the image memory 260 in synchronism with the generated clock. In the present specification, the frequency of the clock which is generated in each of the front surface reading unit 280 and the back surface reading unit 270 and which is used for inputting image data into the image memory 260 is defined as the "input frequency" of the image memory 260. This input frequency corresponds to a transfer rate of image data to the image memory 260 from the front surface reading unit 280 and the back surface reading unit 270.

Also, a clock generator for generating a clock is integrated in the image transfer unit 255 as well, and image data is transferred from the image memory 260 to the image memory 406 in the controller 400 in synchronism with the generated clock. In the present specification, the frequency of the clock which is generated in the image transfer unit 255 and which is used for outputting image data from the image memory 260 is defined as the "output frequency" of the image memory 260. The clock generator of the image transfer unit 255 can generate a clock of a particular frequency in accordance with an instruction of the CPU 251. This output frequency corresponds to a transfer rate for when image data is transferred from the image memory 260.

It is desirable to make the output frequency larger in relation to the input frequency in order to increase the throughput when reading original images in the double-sided mode. Also, in order to maximize the throughput, it is necessary to make the output frequency two or more times the input frequency. In the present embodiment, a first frequency (F1) equivalent to the input frequency and a second frequency (F2) which is twice the first frequency are provided as output frequencies. Image data is transferred from the image reader 200 to the controller 400 at a transfer rate that is higher the higher the output frequency is. Note that the present embodiment is described below using an example of a case where the input frequency and the first frequency (F1) are made to be 20 MHz and the second frequency (F2) is made to be 40 MHz.

<Image Memory Input and Output and Image Formation Timing>

Next, description is given of a method of determining the timing to start transferring image data from the image memory 260 to the controller 400 after the image data generated by the front surface reading unit 280 and the back surface reading unit 270 is stored in the image memory 260.

The CPU 251, prior to starting reading of the image by the scanner unit 209 (the front surface reading unit 280), allocates a storage region for image data in the image memory 260 in advance. When the image reading is started, the CPU 251 stores the image data of the read image into the storage region allocated in the image memory 260. Also, the CPU 251 controls the image processing unit 261 to execute image processing such as color misalignment correction, the above described contamination correction, and the like on the image data stored in the image memory 260. After that, the CPU 251 controls the image transfer unit 255 to start transferring image data from the image memory 260 to the controller 400 at a predetermined timing.

Here, in a case where the output frequency of the image memory 260 is higher than the input frequency, a situation may arise in which input of image data to the image memory 260 (memory input) does not keep up with output of image data from the image memory 260 to the controller 400 (memory output). This situation may arise in, for example, a case in which memory input and memory output start at the same time (or at timings that are close to each other). Accordingly, it is necessary to delay the start timing for the memory output in relation to the start timing for the memory input so that the memory input and the memory output of the image memory 260 complete at approximately the same time.

Accordingly, the CPU 251 starts transferring the image data so that the outputting of the image data from the image memory 260 completes at a timing at which input of the image data of one page from the front surface reading unit 280 and the back surface reading unit 270 to the image memory 260 completes. Specifically, a start time Tst for memory output of the image memory 260 can be determined by the following equation using the original image reading start timing (the start timing of the memory input of the image memory 260) t0 as a reference.

$$Tst = \text{reading size} \times (1 - \text{input frequency}/\text{output frequency})/\text{original conveyance speed} \quad (1)$$

In this fashion, Tst can be determined based on a reading size, which is a size in a direction in which an original to be read is conveyed (sub-scanning direction), an original conveyance speed, and a ratio of the input frequency in relation to the output frequency.

By starting the memory output at a timing at which Tst which is determined using Equation (1) has elapsed since the start timing t0 of the memory input, it is possible to complete the memory input and the memory output of the image memory 260 at approximately the same time. When the printer 300 receives image data transferred via the controller 400 from the image reader 200, the printer 300 performs image formation based on the received image data. In this way, it addition to being able to avoid a situation in which the memory input does not keep up with the memory output (the memory output overtakes the memory input), it becomes possible to quickly start printer output by the printer 300. Note that it is necessary to measure Tst in order to start the memory output at a timing at which Tst has elapsed from t0. This can be realized by measuring the time corresponding to Tst by counting motor pulses of a motor (not shown) that is used for original conveyance control, for example.

COMPARATIVE EXAMPLE

Next, description regarding the timing of control of transfer of image data via the image memory 260 at the time of execution of single-sided copying and double-sided copying of an original will be given in more detail. First, before describing transfer control according to the present embodiment, comparative examples of transfer control will be described with reference to 5A of FIGS. 5 and 6A of FIG. 6.

Figure 5:
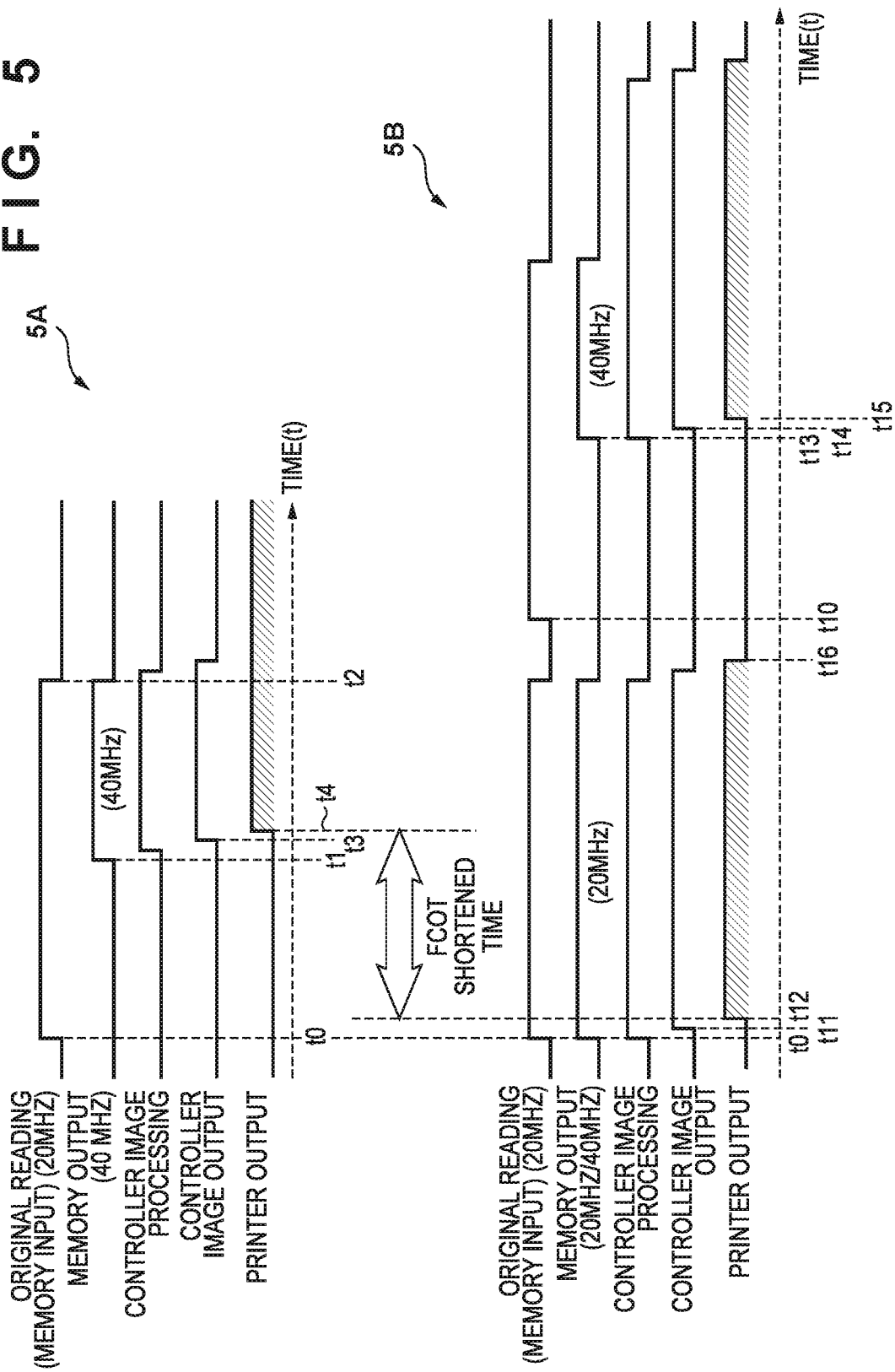
FIG. 5 is a timing chart which illustrates an example of a timing of operations of the image reader 200, of a controller 400, and of a printer 300 respectively (in a single-sided mode).
Figure 6:
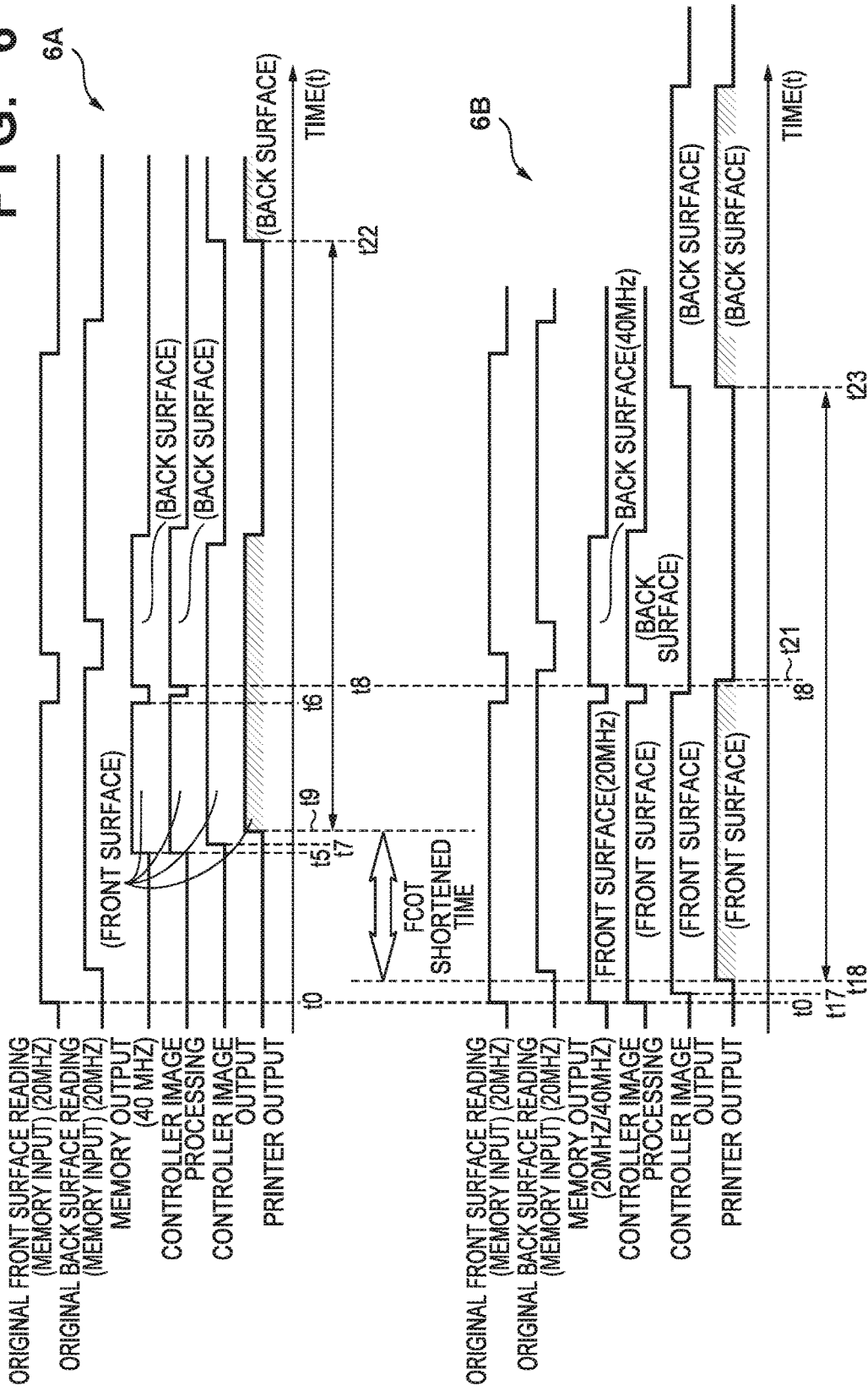
FIG. 6 is a timing chart which illustrates an example of a timing of operations of the image reader 200, of the controller 400, and of the printer 300 respectively (in a double-sided mode).

5A of FIGS. 5 and 6A of FIG. 6 are timing charts that indicate examples of the timing of operation of the image reader 200, the controller 400, and the printer 300, and indicate comparative examples of control of transfer of image data via the image memory 260. In these views, timings of original reading (input of image data into the image memory 260 (memory input)), output of image data from the image memory 260 (memory output), and image processing by the controller 400 are described. Furthermore, timings of output of image data to the printer 300 by the controller 400 and image formation (printer output) by the printer 300 are indicated.

(Single-Sided Mode)

5A of FIG. 5 is a timing chart for a comparative example of control of transfer of image data in the single-sided mode in which single-sided copying of an original is performed. In the example of 5A of FIG. 5, the input frequency of the image memory 260 is 20 MHz and the output frequency is 40 MHz. The start time Tst of the memory output of the image memory 260 is calculated as follows based on Equation (1) in the case where, for example, the original size is A4R (size of 297 mm in the conveyance direction of the original) and the original conveyance speed is 297 mm/s.

$$Tst=297\times(1-20/40)/297=0.5 \text{ [s]}$$

In this case, the CPU 251 causes the image transfer unit 255 to start output of image data from the image memory 260 at a timing (t1) at which 148.5 mm (=297[mm/s]×0.5 [s]) worth of image data in the original conveyance direction is inputted into the image memory 260. Specifically, at t1 when Tst has elapsed since the original image reading start timing (memory input start timing for the image memory 260) t0, memory output is started.

By control of transfer based on the Tst determined using Equation (1), as illustrated in 5A of FIG. 5, at t2, the memory input and the memory output of the image memory 260 complete at the same time. The controller 400 executes image processing by the image processing unit 261 on the image data outputted from the image memory 260, and at t3, starts outputting the image data to the printer 300. When the printer 300 receives image data outputted from the controller 400, at t4, the printer 300 starts image formation (printer output) based on the received image data.

(Double-Sided Mode)

6A of FIG. 6 illustrates a timing chart for a comparative example of control of transfer of image data in the double-sided mode in which double-sided copying of an original is performed. In the double-sided mode, the image data of the front surface and the image data of the back surface of the original, as illustrated in 6A of FIG. 6, will be inputted into the image memory 260 at approximately the same timing. Accordingly, the CPU 251, prior to starting reading the image on the front surface by the scanner unit 209, allocates storage regions for the front surface and the back surface respectively in the image memory 260 in advance. When the image reading is started, the CPU 251 stores the image data of the read image sequentially into the storage region allocated in the image memory 260 and corresponding each of the front surface and the back surface.

As described above, the transfer path for image data of the front surface and the transfer path of image data of the back surface from the image reader 200 to the controller 400 are the same. Accordingly, the CPU 251 transfers image data of the front surface and the back surface stored in the image memory 260 to the controller 400 in order, one side at a time. The CPU 251 first causes the image transfer unit 255 to start output of image data of the front surface from the image memory 260 at t5 when Tst which is determined using Equation (1) elapsed since the reading start timing (memory input start timing) t0 for the image of the front surface of the original. The CPU 251, when notified from the controller 400 that preparation for receiving image data of the next page has completed after transfer of the image data of the front surface completes at t6, causes the image transfer unit 255 to start outputting (transferring) image data of the back surface at t8.

The controller 400 starts image processing on the received image data concurrently to transfer of the image data of the front surface from the image reader 200 to the controller 400, and at t7, starts transfer to the printer 300 of image data after image processing. When the printer 300 receives image data outputted from the controller 400, at t9, the printer 300 starts image formation (printer output) of the front surface based on the received image data according to later described catchup control.

<Catchup Control and Output Frequency Control>

The image forming apparatus 900 of the present embodiment has a function for controlling the printer 300 so as to start image formation based on image data prior to completion of transfer of the image data from the image reader 200 to the controller 400. In the present specification, this is referred to as "catchup control". Normally, the printer 300 is caused to start image formation after the transfer of image data from the image reader 200 to the controller 400 completes. In contrast, in catchup control, under specific conditions, the printer 300 is caused to start image formation by outputting image data from the controller 400 to the printer 300 without waiting for the completion of the transfer of image data from the image reader 200 to the controller 400. In other words, even if the image reader 200 is in the middle of reading an image, the printer 300 starts image formation so as to "catchup".

The aforementioned specific conditions correspond to a case in which the controller 400 can execute image processing and transfer image data to the printer 300 without waiting for completion of transfer of image data from the image reader 200. For example, it is a case in which it is not necessary for the image processing unit 405 of the controller 400 to perform image processing (image rotation, output size change, or the like) that requires image data of the entire original image. In such a case, when the controller 400 receives image data from the image reader 200, the controller 400 sequentially performs image processing by the image processing unit 405 and conversion into image data for image formation by the printer 300, and transfers the obtained image data to the printer 300. In the case of executing the catchup control, it is possible to start image formation by the printer 300 at a timing that is earlier than the case of not executing the catchup control, and it is possible to shorten the FCOT.

However, as described above, it is necessary to make the output frequency higher than the input frequency in order to improve the throughput in the case of concurrently (simultaneously) reading the images of both sides of the original. Meanwhile, in accordance with Equation (1), the higher the output frequency, the more the start timing of the outputting of image data (memory output) from the image memory 260 to the controller 400 needs to be delayed, and this is disadvantageous in regards to shortening of the FCOT. In order to shorten the FCOT by catchup control, it is necessary to lower the output frequency.

Here, the time from start to finish required for printer output by the printer 300 does not depend on the output frequency of the image memory 260. By lowering the output frequency of the image memory 260 and expediting the start timing of the memory output, the timing at which the printer output completes becomes earlier, and as a result, the FCOT can be shortened. On the other hand, the more the output frequency of the image memory 260 is lowered, the more the throughput in the case of simultaneously reading the images of both sides of the original deteriorates.

In the present embodiment, in order to realize both shortening of the FCOT by the catchup control and improving the throughput of reading, two frequencies (the first frequency (F1) and the second frequency (F2) which is higher than the first frequency) are provided as output frequencies of the image memory 260. Specifically, F1<F2. Furthermore, when transferring first image data (image data of a first page) corresponding to a front surface (first surface) of a first original, which affects the FCOT, the output frequency is set to the first frequency, and when transferring other image data, the output frequency is set to the second frequency. In this way, control of the output frequency to switch between the first frequency and the second frequency is enabled in accordance with the image data to transfer. Note that in the present embodiment, as an example, F1 is set as 20 MHz and F2 is set as 40 MHz.

<Memory Output Processing Procedure>

Figure 7:
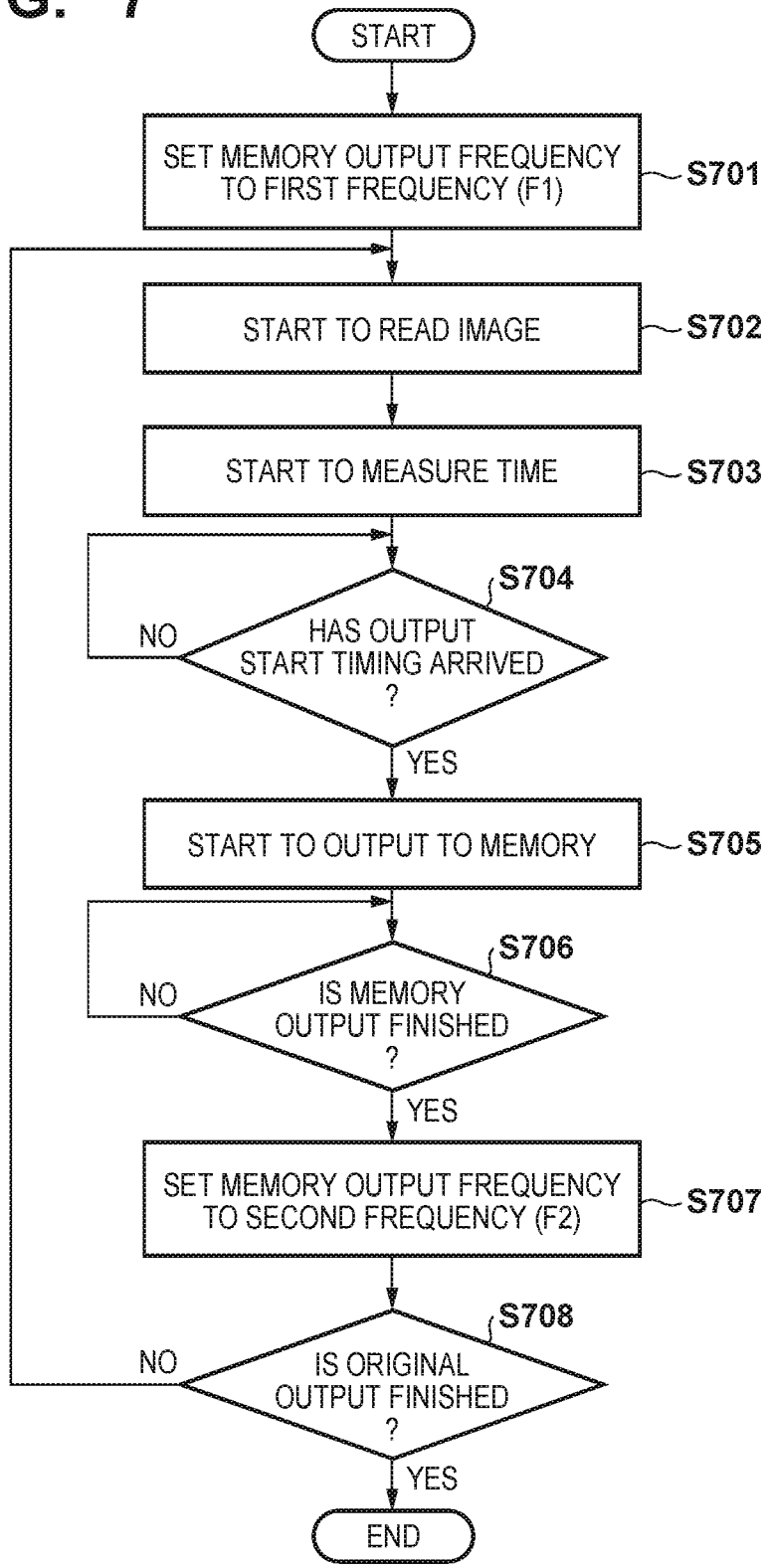
FIG. 7 is a flowchart which describes a procedure of a memory output processing in which image data which is stored in an image memory 260 is transferred to the controller 400.

Next, with reference to the flowchart of FIG. 7, description is given of a procedure, which is executed by the CPU 251 of the image reader 200, of memory output processing that transfers image data stored in the image memory 260 to the controller 400. Processing of each step of FIG. 7 is realized in the image forming apparatus 900 by the CPU 251 reading and executing a control program stored in the ROM 253.

The CPU 251 starts the execution of the memory output processing of FIG. 7 when the ADF 100 and the image reader 200 start a job (copy job) for copying an image of an original in a single-sided mode or a double-sided mode. First, in step S701, the CPU 251, at the time of starting the copy job, sets an output frequency (memory output frequency) corresponding to the transfer rate of image data from the image memory 260, to a first frequency (F1) that is lower than a second frequency (F2). Specifically, the CPU 251, by making an instruction to the image transfer unit 255 to generate a clock at the first frequency (F1), sets the frequency of the clock to be used for the transfer of the image data to the first frequency (F1).

When the setting of the output frequency completes, in step S702, the CPU 251 starts reading of the original image (first page). By this, in the single-sided mode, input into the image memory 260 of image data generated by the front surface reading unit 280 is started. Also, in the double-sided mode, input into the image memory 260 of image data generated by the front surface reading unit 280 and the back surface reading unit 270 respectively is started. Furthermore, in step S703, the CPU 251 starts measurement of time (Tst) at the same time as the start of reading the original image in order to determine the timing of starting output of image data from the image memory 260.

After that, in step S704, the CPU 251 determines whether or not the timing to start outputting image data from the image memory 260 (the memory output start timing) has arrived. The memory output start timing corresponds to the timing when the time Tst which is defined by Equation (1) based on the size of the original to be read, the input/output frequency, and the original conveyance speed has elapsed. The CPU 251 detects the position at which the current read is being performed on the original by counting motor pulses of a motor used for original conveyance control, and determines whether or not Tst has elapsed by comparing the detection result with the distance corresponding to Tst. The CPU 251 advances processing to step S705 if it is determined that Tst has elapsed.

In step S705, the CPU 251 starts transferring the image data stored in the image memory 260 to the controller 400 (specifically, starts a memory output of the image memory 260). Specifically, the CPU 251 causes the image transfer unit 255 to start outputting image data to the controller 400 from the image memory 260. By this, the image transfer unit 255 starts transferring image data of a first page corresponding to the front surface (first surface) of a first original at a first transfer rate corresponding to the first frequency (F1).

At that time, the image transfer unit 255 starts transferring the image data so that the outputting of the image data from the image memory 260 completes at a timing at which input of the image data of the first page from the front surface reading unit 280 and the back surface reading unit 270 to the image memory 260 completes. Accordingly, the image transfer unit 255 starts transfer of the first page of image data at a timing that is earlier the lower the first frequency set as the output frequency is, in both the single-sided mode and the double-sided mode, as will be described later using 5B of FIGS. 5 and 6B of FIG. 6. By such transfer control, it becomes possible to shorten the FCOT of the printer 300.

After that, in step S706, the CPU 251 determines whether or not output (memory output) of the image data of one page has completed, and if the CPU 251 determines the outputting to have completed, the CPU 251 advances the processing to step S707. Note that the CPU 251 counts the number of lines of image data outputted to the controller 400, and when outputting of the number of lines of image data corresponding to the size of the original that is the target of reading has completed, the CPU 251 determines that the outputting of one page of image data has completed.

In step S707, the CPU 251 sets the memory output frequency to the second frequency (F2) when transfer of the first page of image data completes. The CPU 251, by making an instruction to the image transfer unit 255 to generate a clock at the second frequency (F2), sets the frequency of the clock to be used for the transfer of the image data, to the second frequency (F2). The second frequency is higher than the first frequency (F2>F1). Accordingly, image data corresponding to images that are read from the next page (the second page) onward is transferred to the controller 400 at a transfer rate that is higher than that in the transfer of the image data corresponding to the read image of the first page. Accordingly, it is possible to avoid a deterioration in the throughput of reading by the image reader 200.

Next, in step S708, the CPU 251 determines whether or not reading of images of all of the originals that are the target of reading has completed, and output to the controller 400 of all of the corresponding image data has completed. The CPU 251, by returning the processing to step S702 in the case that outputting of all of the image data has not yet completed, repeats the processing of step S702 to step S708, and ends the processing in the case where the outputting has completed.

<Image Data Transfer Control>

Next, with reference to 5B of FIGS. 5 and 6B of FIG. 6, description is given of an example of the timing of control for transferring the image data via the image memory 260 in the case of applying processing in accordance with the procedure of FIG. 7.

(Single-Sided Mode)

5B of FIG. 5 is a timing chart for control for transfer of image data in the single-sided mode according to the present embodiment. In the example of 5B of FIG. 5, the image reader 200, when the job is started, sets the memory output frequency (the output frequency of the image memory 260) to 20 MHz (F1). Note that the input frequency of the image memory 260 is 20 MHz.

The memory output start timing, as described above, is the timing when the time Tst which is defined by Equation (1) has elapsed since the start timing (t0) of the memory input. The image reader 200 (the CPU 251) starts outputting (memory output) to the controller 400 of image data that is stored in the image memory 260, when original image reading (memory input) of the distance corresponding to the time Tst completes.

For example, similarly to 5A of FIG. 5, in the case where the original size is A4R and the original conveyance speed is 297 mm/s, the input frequency and the output frequency are 20 MHz, and so Tst=0 [s] is obtained by Equation (1). This means that it is possible to start memory output at the same time as starting reading (memory input) of the first page of the original image. Accordingly, it is possible to start output of image data from the image reader 200 to the controller 400 at the timing (t0) which is earlier than the memory output start timing (t1) in the comparative example illustrated in 5A of FIG. 5.

In a case where reading of the original image of the first page by the image reader 200 is started and memory output is started, the controller 400 starts receiving image data from the image reader 200. Accordingly, the controller 400 executes image processing by the image processing unit 405 sequentially on image data received from the image reader 200, and converts the image data into image data for image formation by the printer 300. After that, at t11, the controller 400 starts transfer to the printer 300 of the image data after the conversion.

Accordingly, at t12, the printer 300 starts image formation (printer output) based on the image data received from the controller 400 by the catchup control. Specifically, the controller 400 controls the printer 300 to receive image data transferred by the image transfer unit 255 and to perform image formation based on the received image data. At that time, the controller 400, by the catchup control, causes the printer 300 to start image formation based on the image data prior to reception of one page of image data being completed.

As a result of controlling transferring of image data in this way, as illustrated in 5B of FIG. 5, the timing at which the first copy image (of the first page) is outputted (formed) by the printer 300 becomes earlier than in the comparative example of 5A of FIG. 5 in which the memory output frequency is 40 MHz. Specifically, the timing (t16) at which output of a copy image completes becomes earlier, and in other words, the FCOT is shortened by the time difference between t4 and t12.

The image reader 200, after transferring to the controller 400 all of the image data of the first page (image data proportional to the original size), switches the memory output frequency from 20 MHz (F1) to 40 MHz (F2). Accordingly, the memory output start timing (t13) of the next image data becomes the timing at which the time Tst defined by Equation (1) has elapsed, with the reading start timing (t10) of the original image of the second page as a reference.

In a case where the controller 400 receives image data from the image reader 200, the controller 400 executes image processing by the image processing unit 405 sequentially on received image data, and converts the image data into image data for image formation by the printer 300. After that, at t14, the controller 400 starts transfer to the printer 300 of the image data after the conversion. Accordingly, at t15, the printer 300 starts image formation (printer output) based on the image data received from the controller 400 by the catchup control.

(Double-Sided Mode)

6B of FIG. 6 is a timing chart for control of transfer of image data in the double-sided mode according to the present embodiment. In the example of 6B of FIG. 6, the image reader 200, when the job is started, sets the memory output frequency to 20 MHz (F1). Note that the input frequency of the image memory 260 is 20 MHz. In the double-sided mode, the image data of the front surface and the image data of the back surface of the original, as illustrated in 6B of FIG. 6, will be inputted into the image memory 260 at approximately the same timing. In a case where the image reading is started, similarly to the comparative example in 6A of FIG. 6, the CPU 251 stores the image data of the read image sequentially into the storage regions allocated in the image memory 260 that respectively correspond to the front surface and the back surface.

The memory output start timing, similarly to in the single-sided mode as described above, is the timing when the time Tst which is defined by Equation (1) has elapsed since the start timing (t0) of the memory input. The image reader 200 (the CPU 251) starts outputting (memory output) to the controller 400 of image data that is stored in the image memory 260, when original image reading (memory input) of the distance corresponding to the time Tst completes.

For example, similarly to 6A of FIG. 6, in the case where the original size is A4R and the original conveyance speed is 297 mm/s, the input frequency and the output frequency are 20 MHz, and so Tst=0 [s] is obtained by Equation (1). This means that it is possible to start memory output at the same time as starting reading (memory input) of the front surface of the first original image. Accordingly, it is possible to start output of image data from the image reader 200 to the controller 400 at the timing (t0) which is earlier than the memory output start timing (t5) in the comparative example illustrated in 6A of FIG. 6.

In a case where reading of the image of the front surface of the first original by the image reader 200 is started and memory output is started, the controller 400 starts receiving image data from the image reader 200. Accordingly, the controller 400 executes image processing by the image processing unit 405 sequentially on image data received from the image reader 200, and converts the image data into image data for image formation by the printer 300. After that, at t17, the controller 400 starts transfer to the printer 300 of the image data after the conversion.

Accordingly, at t18, the printer 300 starts image formation (printer output) based on the image data received from the controller 400 by the catchup control. Specifically, the controller 400 causes the printer 300 to start image formation to the front surface of a sheet based on the image data prior to reception of one page of image data being completed.

As a result of controlling transferring of image data in this way, as illustrated in 6B of FIG. 6, the timing at which the first copy image is outputted by the printer 300 becomes earlier than in the comparative example of 6A of FIG. 6 in which the memory output frequency is 40 MHz. Specifically, the timing (t21) at which output of a copy image completes becomes earlier, and in other words, the FCOT is shortened by the difference in time between t9 and t18.

The image reader 200, after completing transfer of the image data of the front surface of the first original to the controller 400, switches the memory output frequency from 20 MHz (F1) to 40 MHz (F2). Accordingly, the memory output start timing for the image data of the next page and subsequent pages becomes the timing when the time Tst which is defined by Equation (1) has elapsed, with the reading start timing of the corresponding original image as a reference (or the timing at which it is possible to start thereafter). Here, the memory output start timing of the image data of the back surface of the first original is t8, similar to in 6A of FIG. 6.

In the case where the printer 300 performs image formation on both sides of a sheet, the sheet is conveyed via the double-sided conveying path 112 after completion of image formation of one side. Accordingly, there is the possibility that even if the printer 300 receives the image data of the back surface from the controller 400, due to the length of the double-sided conveying path 112, it will not be possible to start image formation immediately. Accordingly, the controller 400 causes the printer 300 to start image formation to the back surface of the sheet based on image data of one page received from the image transfer unit 255, in synchronization with conveyance of the sheet on the front surface of which an image is formed.

In the comparative example of 6A of FIG. 6, a certain delay occurs for the timing (t22) at which image formation of the back surface is started, in relation to the timing (t9) at which image formation of the front surface is started. In 6B of FIG. 6, a certain delay occurs for the timing (t23) at which image formation of the back surface is started, in relation to the timing (t18) at which image formation of the front surface is started. However, the time interval from t18 to t23 is equivalent to the time interval from t9 to t22 in the comparative example.

Accordingly, by the control of transfer in the present embodiment, the timing at which the printer 300 starts image formation for image data of the front surface of the first original becomes earlier. By this, the timing at which image formation (double-sided copying) to a sheet completes for images on both sides of the first original becomes earlier than in the comparative example, and the FCOT is shortened by the difference in times t9 and t18.

As described above, in the present embodiment, the FCOT is shortened by appropriately setting a transfer rate for when transferring image data stored temporarily in the image memory 260 from the front surface reading unit 280 and the back surface reading unit 270 for image formation based on the image data. Specifically, the CPU 251, at a time of starting a copy job, sets a transfer rate (an output frequency of the image memory 260) to a first transfer rate (first frequency) that is lower than a second transfer rate (second frequency). Also, the CPU 251 sets the transfer rate to the second transfer rate (second frequency) when transfer of the image data of the first page which corresponds to the front surface of a first original completes. By controlling transfer of the image data in this way, it is possible to shorten the FCOT without causing the throughput of reading by the image reader 200 to deteriorate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-040916, filed Mar. 3, 2017, which is hereby incorporated by reference herein in its entirety.

What is claimed is:

1. An image forming apparatus, comprising:
a tray on which an original bundle is stacked;
a feeding unit configured to feed an original from the tray one by one to a conveyance path;
a first reading unit configured to read an image of a first surface of the original conveyed through the conveyance path;
a second reading unit, provided downstream of the first reading unit in the conveyance path, configured to read an image of a second surface of the original;
a first storage unit configured to temporarily store image data generated by the first reading unit and the second reading unit;
a clock generator configured to generate a transfer clock;
a transmitter configured to transfer the image data stored in the first storage unit based on the transfer clock;
a second storage unit configured to store the image data transferred by the transmitter; and
an image forming unit configured to form an image based on the image data stored in the second storage unit,
wherein in a case where copying of the original bundle is executed, a frequency of a first transfer clock for transferring image data of the first surface of a first original in the original bundle is lower than a frequency of a second transfer clock for transferring image data of the second surface of the first original and image data of the first surface of a second original in the original bundle.

2. The image forming apparatus according to claim 1, wherein
the transmitter starts transferring the image data of the first surface of the first original at a timing that is earlier the lower the frequency of the first transfer clock is.

3. The image forming apparatus according to claim 1, wherein
the transmitter starts transfer of image data such that output of the image data of the first surface of the first original from the first storage unit completes at a timing at which input of the image data from the first reading unit to the first storage unit completes.

4. The image forming apparatus according to claim 1, wherein
the transmitter determines a timing at which transfer of image data of the first surface of the first original is started based on a size in a conveyance direction of the original, a conveyance speed of the original, and a ratio of a frequency of a transfer clock for transferring image data from the first reading unit and the second reading unit to the first storage unit in relation to a frequency of a transfer clock for transferring image data by the transmitter.

5. The image forming apparatus according to claim 1, further comprising:
a controller configured to,
prior to completion of reception of the image data of the first surface of the first original from the transmitter, start image processing on the image data of the first surface of the first original.

6. The image forming apparatus according to claim 5, wherein
prior to completion of reception of the image data of the first surface of the first original from the transmitter, the controller causes the image forming unit to start image formation to a first surface of the sheet based on the image data, and
in synchronization with conveyance of the sheet on the first surface of which an image is formed, the controller causes the image forming unit to start image formation to a second surface of the sheet based on the image data of the second surface of the first original received from the transmitter.

7. The image forming apparatus according to claim 6, wherein
the frequency of the second transfer clock is two times or more a frequency of a third transfer clock for transferring image data from the first reading unit and the second reading unit to the first storage unit.

8. The image forming apparatus according to claim 1, wherein
the first reading unit and the second reading unit can simultaneously store image data in a first storage region and a second storage region of the first storage unit respectively, and
the transmitter transfers the image data stored in the first storage region and the image data stored in the second storage region in order over the same transfer path.

9. The image forming apparatus according to claim 1, wherein
the frequency of the first transfer clock is equal to a frequency of a third transfer clock for transferring image data from the first reading unit and the second reading unit to the first storage unit, and
the frequency of the second transfer clock is two times the frequency of the third transfer clock.

10. The image forming apparatus according to claim 1, wherein
the second reading unit, while an image of the first surface of the original that is conveyed over the conveyance path is being read by the first reading unit, reads an image of the second surface of the original.

* * * * *